United States Patent [19]

Hanna et al.

[11] Patent Number: 5,565,546
[45] Date of Patent: Oct. 15, 1996

[54] COPOLYMER OF CARBON MONOXIDE AND ETHYLENE CONTAINING KETAL STRUCTURES

[75] Inventors: Paul K. Hanna, East Windsor, N.J.; Andrzej M. Piotrowski, Peekskill, N.Y.; Bert J. Lommerts, Dieren, Netherlands; Steven R. Leijenaar, Arnhem, Netherlands; Gerrit Hoentjen, Westervoort, Netherlands

[73] Assignee: Akzo Nobel NV, Arnhem, Netherlands

[21] Appl. No.: 435,264

[22] Filed: May 5, 1995

[51] Int. Cl.$^6$ .............................. C08G 67/02; C08F 6/00
[52] U.S. Cl. ........................ 528/392; 528/271; 528/480; 528/490; 528/495
[58] Field of Search ................................ 528/392, 271, 528/480, 490, 495

[56] References Cited

U.S. PATENT DOCUMENTS

| H983 | 11/1991 | Brown et al. | 264/211.17 |
|---|---|---|---|
| 5,041,530 | 8/1991 | Van Doorn et al. | 528/392 |
| 5,106,952 | 4/1992 | Drent | 528/392 |

FOREIGN PATENT DOCUMENTS

| 310171 | 4/1989 | European Pat. Off. | D01F 6/30 |
|---|---|---|---|
| 485035 | 5/1992 | European Pat. Off. | C08G 67/02 |

OTHER PUBLICATIONS

A. Batistini et al., "Mechanistic Aspects of Alternating Copolymerization of Carbon Monoxide with Olefins Catalyzed by Cationic Palladium Complexes", Organometallics 1992, 11, 1766–1769.

P. W. Wong et al., "Palladium–Catalyzed Alternating Copolymerization of Propylene and Carbon Monoxide. Formation of Poly(spiroketal/ketone)", Ind. Eng. Chem. Res. 1993, 32, 986–988.

Primary Examiner—Shelley A. Dodson
Attorney, Agent, or Firm—Richard P. Fennlly; Louis A. Morris

[57] ABSTRACT

Copolymers comprising carbon monoxide and ethylene contain at least one type of ketal structure and possess enhanced thermal stability so as to be useful in the melt processing of fibers. These novel copolymers, as well as known polyketones with ketal structures, can be formed by treating a copolymer of carbon monoxide and at least one olefin with a mixture of acid, such as a sulfonic acid, which acts as a catalyst or catalyst/reagent, and alcohol, such as a lower alkanol.

20 Claims, No Drawings

COPOLYMER OF CARBON MONOXIDE AND ETHYLENE CONTAINING KETAL STRUCTURES

BACKGROUND OF THE INVENTION

It has been reported first for copolymers of carbon monoxide and propylene and then for copolymers of carbon monoxide with cyclic olefins that the recovered copolymer can show, at least in part, a spiroketal structure. See, Organometallics 1992, 11, 1766–1769, Ind. Eng. Chem. Res. 1993, 32, 986–988, and U.S. Pat. Nos. 5,041,530 and 5,106,952.

Certain types of polyketone polymers are melt processable, e.g., into fibers, but only with difficulty due to their limited thermal stability and propensity to undergo crosslinking during processing. The copolymer comprising carbon monoxide and ethylene (See European Patent Publication No. 310,171 and U.S. Statutory Invention Registration No. H983) is the prime example.

SUMMARY OF THE PRESENT INVENTION

The present invention relates to novel linear, alternating copolymers of carbon monoxide and ethylene, optionally also containing a minor amount of propylene as a termonomer, which contain ketal structures. According to DSC analysis, such copolymers exhibit better thermal stability than conventional copolymers of such type which do not contain such ketal structures. They exhibit a lower melting point than copolymers not containing such structures thereby allowing for melt processing at lower temperatures, e.g., to form fiber, which is yet another embodiment of the present invention.

Another embodiment of the present invention pertains to a novel process for forming ketal structures in polyketone polymers (i.e., copolymers of carbon monoxide and at least one α-olefin, such as ethylene, propylene, mixtures of ethylene and propylene, and so forth). This process comprises treating the selected polyketone polymer with an alcohol in the presence of a catalyst/reagent which is effective in forming "ketal" structures, as that term is further defined herein.

DESCRIPTION OF PREFERRED EMBODIMENTS

The process of the present invention is applicable to be used to convert the known class of linear, alternating polyketones, formed by the copolymerization of carbon monoxide and at least one α-olefin, into a modified polymer containing ketal structures. The conventional polyketone polymer which can be used in the instant invention is formed by conventional techniques involving reacting carbon monoxide and the selected α-olefin component in the presence, for example, of a palladium compound, an anion of a non-hydrohalogenic acid having a pKa of below about 6, and an appropriate polydentate ligand.

The terminology "ketal", as used herein, is intended to cover spiroketal structures, hemiketal structures, and hemiketal/ketal structures. The spiroketal structures have the oxygen atom derived from the carbonyl group in the conventional polyketone polymer bonded to flanking carbon atoms. There can be from one to about five, preferably about three, adjacently situated spiro ring structures in the polymer in accordance with the present invention. In the hemiketal structure the carbonyl oxygen is converted to hydroxy and/or alkoxy, for example, and is bonded to a single carbon atom. In the ketal structure, the oxygen is bonded on one side to a carbon atom and on the other to an alkoxy moiety, for example, and/or hydroxy. Representative structures, of reasonable simplicity, can be exemplified by the following:

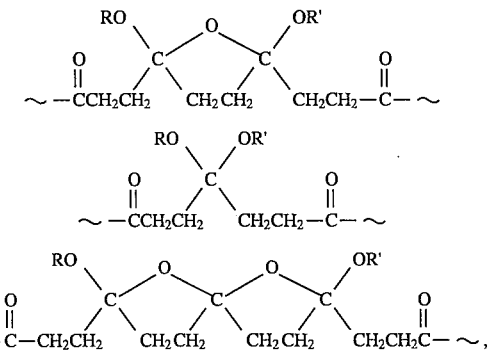

where R is hydrogen and R' is independently selected from the group consisting of hydrogen and alkyl. Longer spiro units are within the contemplation of the present invention, for example, up to about five spiro units linked together.

The aforementioned conventional polyketone polymers can be effectively treated in accordance with the novel process of the present invention by use of a combination of acid, which functions as a catalyst/reagent herein, and alcohol under conditions which form ketal structures therein. In situations where alkoxy groups are not present in the ketal structures, the acid can be viewed as functioning as a catalyst for the reaction, whereas if alkoxy groups are present, the acid functions as a reagent as well.

Representative acids which include those with a pKa of below about 6, preferably below about 2, such as oxygen-containing inorganic acids (e.g., sulfuric or perchloric acid), carboxylic acids (e.g., trichloroacetic acid, dichloroacetic acid and trifluoroacetic acid), and sulfonic acids (e.g., p-toluenesulfonic acid, methanesulfonic acid, and trifluoromethanesulfonic acid). Representative alcohols include such lower alkanols as methanol, ethanol, propanol, and butanol. In general, the treatment can take place by placing the polyketone polymer in an alcohol solvent medium containing an effective amount (e.g., from about 100 ppm to about 10,000 ppm, based on the weight of polymer) of the selected acid and the mixture can be heated (e.g., from about 20° C. to about the reflux temperature of the alcohol) to form the desired ketal structures in the polyketone polymer thus treated. If desired, the acid can be present in trace amounts as a catalyst residue from the original process from forming the polyketone polymer. Room temperature reaction conditions are acceptable.

As shown in Table 3 which follows, it is possible to produce melt spun polyketone fibers in accordance with the present invention which have a tenacity of no less than about 1000 mN/tex which are the highest presently known values for the tenacity of the subject melt spun polymer.

The following Examples illustrate further preferred embodiments of the present invention.

EXAMPLES

General Polymerization Process

Polymerization experiments were conducted in a ten liter autoclave using a catalyst formed from 0.5 millimole of Pd(CH$_3$COO)$_2$, 1 millimole of CH$_3$C$_6$H$_4$SO$_3$H, and 0.5 millimole of Ph$_2$CH$_2$CH$_2$CH$_2$PPh$_2$, a 1:1 gas mixture of carbon monoxide and ethene, and four liters of benzyl alcohol. Polymerizations were conducted under 41 bar pressure of a 1:1 carbon monoxide:ethene atmosphere and 14 bar hydrogen at 85° C. The product was a carbon monoxide-ethane polyketone having a limiting viscosity number (LVN) of 0.6 as measured in m-cresol at 100° C. The polymer was separated by filtration, washed with methanol, dried and washed with hot acetylacetone for ten minutes. This polymer was then used in the stability evaluation experiments described below. All stability measurements were conducted on an RMS 800 RHEOMETER apparatus under nitrogen atmosphere at a maximum temperature of 265°±2° C.

COMPARATIVE EXAMPLE 1

The polyketone product was placed in the apparatus and its time to gelation was 540 seconds, its melting point was 258.5° C., and its rate of crosslinking was 5.7 d η"/dt (P).

COMPARATIVE EXAMPLE 2

The polyketone (2.78 gm) was suspended in 100 ml of methanol and was suspension stirred under reflux for two hours. Polymer product was then separated by filtration and dried at 90° C. A dried sample was then placed in the apparatus, and its gel point was 570 seconds, its melting point was 258° C., and its rate of crosslinking was 6.35 P.

EXAMPLES 3–6

Polyketone (5 gm) was suspended in 120 ml of methanol containing 0.01 gm of p-toluenesulfonic acid and was suspension stirred under reflux for 2.5 hours. During this time samples were taken after one-half hour (Example 3), 1.5 hours (Example 4), and 2.5 hours (Example 5). An additional sample was taken after the polymer suspension was stirred at room temperature for seventeen hours (Example 6). All polymer samples were separated by filtration, were washed with copious amounts of pure methanol, and were dried at 90° C. Each sample was then evaluated on the RHEOMETER apparatus as depicted in Table 1, below.

Solid state $^{13}$C CPMAS NMR spectroscopy of the polymer sample from Example 6 provided evidence indicative that the most likely of the three possible structures shown below for the resulting CO/ethylene copolymer was the structure designated "spiroketal", containing one methoxy group and three ketal carbons at the centerpoint of the two adjacent ring structures:

Hemiketal/Ketal:

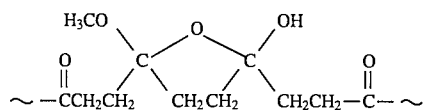

Hemiketal:

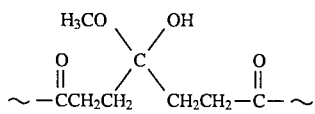

Spiroketal:

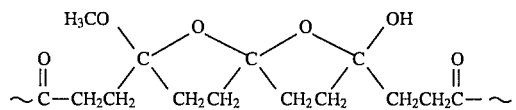

Table 1 sets forth the times to gel point, the melting points, and the rates of crosslinking for the polyketone samples of the preceding Examples 3–6:

TABLE 1

| Polymer from Example | Time to gel point (sec)* | Melting point (°C.) | dη"/dt (P)** |
| --- | --- | --- | --- |
| 3 | 1150 | 252.5 | 1.6 |
| 4 | 1050 | 249.5 | 1.8 |
| 5 | 1120 | 249 | 1.2 |
| 6 | 1500 | 247 | 0.59 |

*Measured with ± 5% reproducibility.
**Measured with ± 12% reproducibility.

EXAMPLE 7

This Example provide a description of a number of melt extrusion experiments of POK-hemiketal on a Berstorff twin screw extruder (25 mm) equipped with a 3 mm die. The goal of the experiments was to test the processability of the copolymer of carbon monoxide and ethylene (POK) containing hemiketal structures. Three different POK batches were melt extruded into thick threads.

| Sample Designation | Stabilizers Used* | LVN/dl | $T_m$/°C. |
| --- | --- | --- | --- |
| 9204S | CaHA (1 wt %) Irganox 1010 (0.5 wt %) | 0.89 | 244 |
| 9204S2 | CaHA (1 wt %) Irganox 1010 (0.5 wt %) Nucrel 535 (1 wt %) | 0.89 | 244 |
| 9302S | CaHA (1 wt %) Irganox B215 (0.5 wt %) | 1.0 | 246 |

*CaHA stands for calcium hydroxyapatite. Irganox 1010 brand stabilizer is available from Ciba-Geigy Corp. and comprises tetrakis(methylene-3,3',5'-di-tert-butyl-4'-hydroxyphenyl propionate) methane.
Nucrel 535 brand stabilizer is available from E.I. DuPont de Nemours & Co. and comprises a copolymer of ethylene and methacrylic acid.
Irganox B215 brand stabilizer is available from Ciba-Geigy Corp. and comprises the 3,5-bis (1,1-dimethylethyl)-4-hydroxy-2,2-bis[[3,5-bis(1,1-dimethylethyl)-4-hydroxyphenyl]-1-oxopropoxylmethyl]-1,3-propanediyl ester of benzenepropanoic acid mixed with tris[2,4-bis(1,1-dimethylethyl)phenyl] phosphite.

The relatively low melting temperature of the polymer indicated that a certain amount of hemiketal functionalities were present in the polymer. This also corresponds with the 1% to 1.5% weight loss upon heating to above the melting temperature of these samples, due to the liberation of methanol. The methanol evolution is measured using a thermal desorption technique in combination with GC analysis.

The extruder was equipped with a degasser in the last zone of the extruder in order to remove methanol, which is liberated by the decomposition of hemiketal functionalities. Also water is removed, which is formed as the main degradation product. Prior to the experiments, the extruder was "cleaned" with polypropylene. The first trial was conducted at an extrusion temperature of 270° C. as the set point in order to prepare a POK melt, free of persistent nucleii for crystallization.

TABLE 2

Conditions applied for the melt extrusion experiments of POK-hemiketal.

| | | Zone temperatures (setting) (°C.) | | | | | |
|---|---|---|---|---|---|---|---|
| Code | RUN | 1 | 2 | 3 | 4 | 5 | 6 |
| 9302S | 1 | 260 | 270 | 260 | 260 | 260 | 260 |
|  | 2 | 260 | 270 | 260 | 260 | 260 | 260 |
| 9204S | 2 | 260 | 270 | 260 | 260 | 260 | 260 |
| 9302S | 3 | 260 | 270 | 255 | 255 | 255 | 255 |
|  | 4 | 260 | 270 | 255 | 255 | 255 | 255 |
| 9204S2 | 4 | 260 | 270 | 255 | 255 | 255 | 255 |
|  | 5 | 260 | 265 | 255 | 250 | 250 | 250 |
| 9302S | 6 | 260 | 265 | 255 | 255 | 255 | 255 |
|  | 7 | 260 | 265 | 250 | 250 | 250 | 250 |

| Code | RUN | Extruder Head (°C.) | Polymer Temp.* | Head Pressure** |
|---|---|---|---|---|
| 9302S | 1 | 260 | 283 | — |
|  | 2 | 260 | 273 | 15 |
| 9204S | 2 | 260 | — | — |
| 9302S | 3 | 255 | 269 | — |
|  | 4 | 250 | 260 | 17 |
| 9204S2 | 4 | 250 | 260 | — |
|  | 5 | 250 | 259 | — |
| 9302S | 6 | 255 | 267 | 15 |
|  | 7 | 250 | 265 | 17 |

*gives the temperature of the polymer in the head (in °C).
**gives the pressure on the polymer in the head (in bar).

In Run 1, the extruder was run at 200 rpm and is Runs 2–7, it was run at 100 rpm. All the melt extruded POK samples had a yellowish color and the color became more intense at higher processing temperatures and longer residence times. The lowest possible processing temperature was achieved in Run 5. At lower temperatures the extrusion die is blocked by solid polymer particles (T<258° C.). The lowest attainable processing temperature was still significantly higher than the melting temperature of the unprocessed polymer (ΔT=12°–14° C.), which is a first indication that the melting temperature of POK hemiketal is increased upon processing.

For the CE9204S and the CE 9204S2 samples, the formation of gaseous species was rather high and molten polymer was dragged through the degasser and the degasser was finally blocked by solidified polymer. At lower processing temperatures, the gas formation was not entirely suppressed, and the formation of gas bubbles in the extrudate was also visible. By increasing the winding speed of the extrudate, a thread with a smaller diameter was obtained. After drawing, these thick monofilaments show a tensile strength of about 400 mN/tex.

Compared with the previously described experiment, the extrusion of the CE9302S sample was rather successful. The formation of gas was significantly lower than for the CE9204 samples. Again, by increasing the winding speed of the extrudate a thick monofilament is obtained. Monofilaments have been drawn batchwise on a thermorheometer. Since parts of the fiber close to the crosshead remained undrawn, the effective draw ratio $\lambda_{eff}$ was determined by measuring the length of the drawn part of the fiber. In the temperature range of interest, the effective draw ratio is about 10% higher than the set draw ratio. In Table 2 the properties are listed of the monofilaments prepared at an initial draw rate of about 100–200%/min and under different temperature conditions. The average values were determined from five independent tensile tests, and the numbers between parenthesis are the maximum observed values for the tensile strength and the corresponding yarn count, elongation at break, and initial tensile modulus.

TABLE 3

Properties of drawn CE9302S monofilaments.

| Run No. | $\lambda_{eff}$ | T (°C.) | Yarn count (dtex) | Ten. Stren. (mN/tex) | Elongation at break (%) | Inh. Mod. (N/tex) |
|---|---|---|---|---|---|---|
| 1 | 10.2 | 210 | 631 (481) | 766 (870) | 6.0 (5.2) | 13.8 (18.0) |
| 2 | 10.0 | 210 | 1264 (1085) | 731 (840) | 7.7 (7.4) | 10.7 (11.8) |
| 3 | 11.4 | 190/205 | 856 (655) | 822 (1121) | 6.1 (6.4) | 15.4 (19.8) |
| 4 | 9.6 | 210 | 628 (547) | 757 (899) | 7.8 (8.1) | 10.5 (11.9) |
| 5 | 10.1 | 210 | 638 (577) | 792 (872) | 7.6 (7.8) | 11.5 (12.2) |
| 6 | 11.0 | 210 | 603 (520) | 752 (853) | 6.9 (7.1) | 11.8 (12.7) |
| 7 | 10.0 | 210 | 584 (568) | 709 (745) | 6.3 (6.0) | 12.3 (13.1) |
| 8 | 10.6 | 210 | 1017 (893) | 718 (832) | 6.5 (6.5) | 11.9 (13.8) |
| 9 | 10.5 | 210 | 789 (662) | 786 (908) | 6.6 (6.4) | 12.7 (15.4) |
| 10 | 10.5 | 210 | 685 (539) | 787 (938) | 6.7 (6.2) | 12.6 (15.9) |
| 11 | 9.8 | 210 | 559 (412) | 695 (817) | 6.9 (5.4) | 11.9 (16.1) |

X-ray diffraction analysis showed that the crystal structure of the drawn fibers is the POK-β structure and only very minor amounts of the POK-α structure were formed. Furthermore, due to the liberation of methanol by the decomposition of hemiketal functionalities, the melting point of extruded POK is higher than the melting temperature of as-polymerized "converted" POK as is show in Table 4 which shows the melting temperature of as-synthesized and extruded POK samples.

TABLE 4

| Sample | Tm (°C.): As-synthesized | Tm (°C.) |
|---|---|---|
| CE9204S2 | 244 | 252 |
| CE9302S | 246 | 252 |

These Examples describe an improved melt processability for the tested polyketone due to the incorporation of reversible chemical defects which enables the processing of the polymer into fiber-like material (elongated objects). For solution spinning, this concept is commonly applied for cellulose derivatives (esters), but require a subsequent hydrolysis step in the process. In the POK hemiketal material, the reversible defects are removed during processing at elevated temperatures resulting in a higher melting temperature of the polymer.

The experiments demonstrate that POK-hemiketal can be melt extruded into thick monofilaments provided that suitable stabilizers are used, for example, calcium hydroxy apatite and an antioxidant. The fiber properties that were obtained were satisfying, especially considering the relatively high yarn count of the threads. Also, the combination of high modulus (15–19 N/tex) and a relatively high tensile strength (850–1100 mN/tex) makes the POK material useful as a starting material for melt spun industrial fiber applications.

EXAMPLE 8

This Example shows the effect of aftertreatment on the melting point depression due to the formation of ketal structures in the polyketone product.

A 170 liter stainless steel reactor was charged with 140 liters of methanol and 500 gm of a copolymer of carbon monoxide and ethylene ("polyketone-C2"). Next, the oxygen present was removed by alternating raising the pressure in the reactor to 500 kPa using nitrogen and then creating a vacuum. This procedure was repeated three times.

The reactor was pressurized by adding carbon monoxide in such a way that the pressure was 50 kPa. Then, a catalyst solution of 1.4995 gm of palladium(II)-acetate, 3.4644 gm of 1,3-bis-diphenyl-phosphino-propane, and 3.4781 gm of para-toluene-sulphonic acid in 1500 ml of trifluoroethanol was added. Carbonmonoxide and ethene were added such that an excess of 0.2 kg of ethene was added to the reactor. The reactor contents were heated to 60° C., and the pressure was raised to 2100 kPa using a 1:1 gas mixture of CO and ethene. The pressure and the temperature were maintained for forty-eight hours.

Subsequently, the polymer slurry was filtered off using a filter with a diameter of 1 meter, and it was then washed with 75 l of methanol. The total filter residence time was approximately one and one half to two hours.

The product from the filter was dried in a Nauta mixer for about seventy hours at a temperature of 60° C. and a final pressure of 0.1 kPa. The polyketone-C2 thus obtained had an intrinsic viscosity of 0.89 dl/g and a DSC melting temperature of 244° C.

The slurry dried immediately after being taken from the reactor without washing or filtration had a melting point of 255° C.

EXAMPLE 9

This Example illustrates the effect of time on the melting point characteristics of the subject polymer.

A 1.8 liter stainless steel reactor was charged with 1.25 liters of methanol and 5 gm polyketone-C2. Next, the oxygen present in the reactor was removed by alternating raising the pressure in the reactor to 500 kPa using nitrogen and then creating a vacuum. This procedure was repeated three times. A catalyst solution of 13.04 mg of palladium(II)-acetate, 29.90 mg of 1,3-bis-diphenyl-phosphino-propane, and 29.16 mg of para-toluene-sulphonic acid in 10 ml trifluoroethanol was then added.

The reactor contents were heated to 60° C., and the pressure was raised to 2050 kPa using a 1:1 gas mixture of CO and ethene. The pressure and the temperature were maintained for sixty-five hours. Cooling of the reactor contents before further elaboration took about five hours.

Subsequently, the polymer slurry was split in three portions and was treated in the following ways:

A: The slurry was filtered off using a Buechner filter;

B: The slurry was filtered and washed with 1 liter of methanol with a total residence time on the filter of one half to one hour; and C: The slurry was filtered and washed with 2 liters of methanol with a total residence time on the filter of three hours.

The following melting points were obtained using DSC analysis:

Sample A: 254° C.
Sample B: 252° C.
Sample C: 249° C.

The foregoing Examples illustrate certain embodiments of the present invention and, for that reason, should not be used to limit the present invention. The scope of protection sought is set forth in the claims which follow.

We claim:

1. A linear, alternating copolymer of carbon monoxide and ethylene which contains ketal structures.

2. A copolymer as claimed in claim 1 which comprises at least one structure selected from the group consisting of:

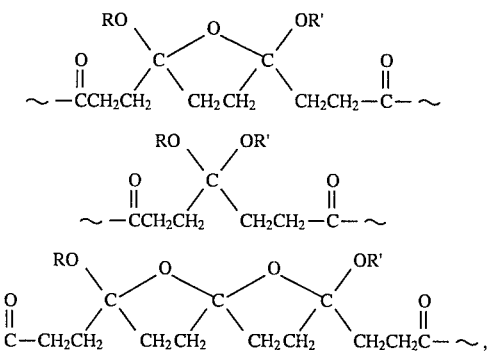

where R is hydrogen and R' is independently selected from the group consisting of hydrogen and alkyl.

3. A copolymer as claimed in claim 1 which comprises the following structure:

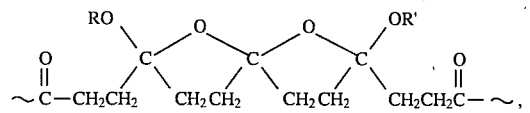

where R is hydrogen and R' is alkyl.

4. A copolymer as claimed in claim 3 where R is lower alkyl.

5. A copolymer as claimed in claim 3 where R is methyl.

6. A process for forming a copolymer of carbon monoxide and at least one olefin which contains ketal structures which process comprises treating a copolymer of carbon monoxide and at least one olefin with a mixture of acid and alcohol to form the copolymer of carbon monoxide and at least one olefin which contains the ketal structures.

7. A process as claimed in claim 6 wherein the acid has a $pK_a$ of below about 6.

8. A process as claimed in claim 6 wherein the acid has a $pK_a$ of below about 2.

9. A process as claimed in claim 6 wherein the alcohol is a lower alkanol.

10. A process as claimed in claim 6 wherein the alcohol is methanol.

11. A process as claimed in claim 6 wherein the acid has a $pK_a$ of below about 6 and the alcohol is a lower alkanol.

12. A process as claimed in claim 6 wherein the acid has a $pK_a$ of below about 2 and the alcohol is a lower alkanol.

13. A process as claimed in claim 11 wherein the acid is a sulfonic acid.

14. A process as claimed in claim 6 wherein the olefin is selected from the group consisting of ethylene and mixtures of ethylene with a lesser amount of propylene.

15. A process of forming a fiber by melt processing the copolymer of claim 1.

16. A process of forming a fiber by melt processing the copolymer of claim 2.

17. A process of forming a fiber by melt processing the copolymer of claim 3.

18. A process of forming a fiber by melt processing the copolymer of claim 4.

19. A process of forming a fiber by melt processing the copolymer of claim 5.

20. A melt spun fiber comprising a copolymer of carbon monoxide and ethylene having a tenacity of no less than about 1000 mN/tex.

* * * * *